Sept. 9, 1952  R. R. REED  2,609,557
HAND BROOM
Filed Nov. 4, 1944
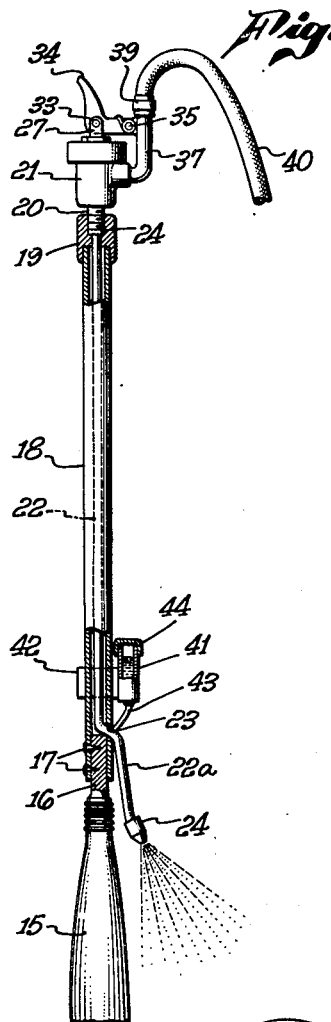
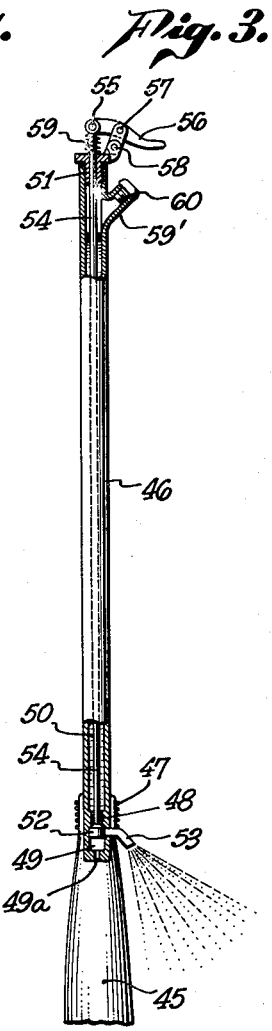
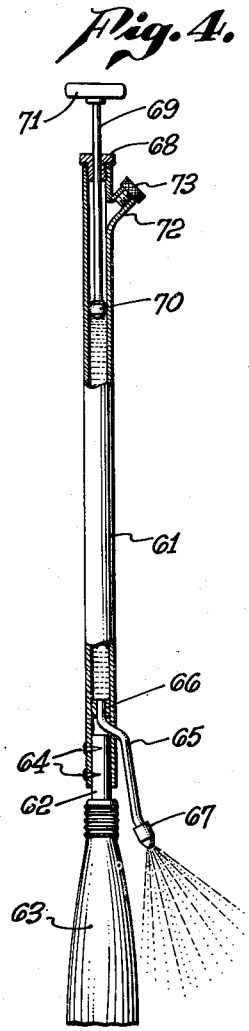
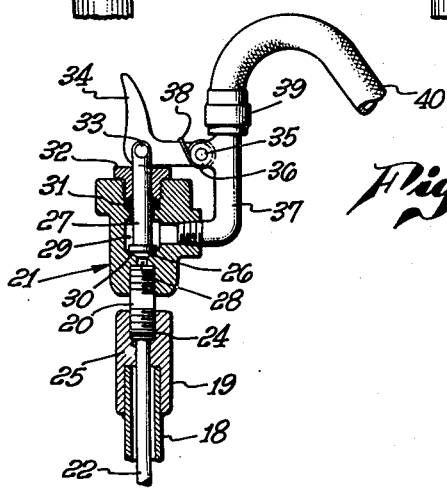
RALPH RAYMOND REED
INVENTOR.
BY 
ATTORNEY.

Patented Sept. 9, 1952

2,609,557

UNITED STATES PATENT OFFICE 2,609,557

HAND BROOM

Ralph Raymond Reed, Burbank, Calif.

Application November 4, 1944, Serial No. 562,000

1 Claim. (Cl. 15—129)

My invention relates to hand brooms, and it has for a purpose the provision of a hand broom embodying a device by which a sterilizing solution can, during the normal sweeping movements of the broom, be sprayed onto the floor or other surface being swept for the dual purpose of arresting and settling the rising dust, and at the same time sterilizing both the dust and the floor or other surface, to the end of destroying all germs and killing moths and other insects.

It is also a purpose of my invention to provide in a hand broom a handle which is hollow to provide a chamber in which the sterilizing solution is stored and adapted to be discharged under the control of the person using the broom, and where various means are employed to place the solution under such pressure that it is discharged from the nozzle in an effective dust arresting and settling spray.

A further purpose of my invention is the provision of a spraying device for the sterilizing solution which can be attached to or detached and used separately from the broom, as may be desirable in some instances.

I will describe only three forms of brooms and spraying devices, each embodying my invention, and will then point out the novel features thereof in the claim.

In the accompanying drawings:

Fig. 1 is a view showing one form of hand broom in elevation and partly in section, and spraying device therefor, embodying my invention.

Fig. 2 is an enlarged fragmentary sectional view, partly in elevation, showing the elements and the spraying device on the upper end of the broom handle.

Fig. 3 is a view similar to Fig. 1 showing another form of hand broom and spraying device embodying my invention.

Fig. 4 is a view similar to Fig. 3 showing a third form of broom and spraying device embodying my invention.

Similar reference characters refer to similar parts in each of the views.

With specific reference to the drawings, and particularly to the form of my invention shown in Figs. 1 and 2, and which is the preferred embodiment, it comprises a conventional broom head 15 in which is suitably secured a handle section 16 preferably formed of wood. To the projecting end of the handle section is detachably secured, by a connection which may be in the form of screws 17, the lower end of a main handle section 18.

This handle section 18 is of suitable length and tubular, and it may be preferably formed of metal and receive at its lower end the upper end of the handle section 16. At its upper end the handle section 18 is secured in the lower end of a metal coupling 19, the upper end of the latter having threaded therein a short length of pipe 20 which serves to connect the coupling to a metallic fitting 21.

A metallic tube 22 is contained in the handle section 18 with its lower portion 22a extending from the handle section through a suitable opening 23 and terminating at a point to one side of the brush head 15 where it is provided with an outwardly and downwardly projecting spray nozzle 24. At its upper end the tube 22 extends into the coupling 19 where it is formed with a collar 24 reposing on a shoulder 25 in the coupling, and secured thereto by the lower end of the pipe 20.

The fitting 21 provides a housing for a valve 26 which is fixed to the lower end of a stem or rod 27 movable in the fitting to open and close a duct 28 leading downwardly from a chamber 29 and provided with a seat 30. The rod 27 is movable through a packing ring 31 and a follower 32 threaded in the fitting. The projecting end of the valve stem is bifurcated, and by a pin 33 is pivoted to an L-shaped lever 34 fulcrumed by a pin 35 on ears 36 secured to an elbow pipe 37.

By means of a torsion spring 38 associated with the pin 35 and the lever 34, the stem 27 is urged downwardly to close the valve 26 on its seat 30. Thus it will be clear that to open the valve the stem can be pulled upwardly against the tension of the spring by pushing laterally on the free end of the lever to swing the latter upwardly about its fulcrum 35.

The upper end of the pipe 37 is threaded to receive a conventional coupling 39 of a hose 40, the hose adapted to be connected to a source of water under pressure such as a faucet (not shown).

For the purpose of intermixing with the water supplied to the tube 22 a suitable sterilizing or germicidal agent for arresting, settling and sterilizing the dust rising from a floor during sweeping thereof, and to kill moths and other insects when sweeping floor coverings, a container 41 for the agent in liquid form, is secured to the handle section 18 by a clip 42. From the bottom end of this container leads a tube 43 to the tube portion 22a so that the sterilizing liquid which is introduced into the container by first removing a screw cap 44 therefrom, may be drawn by suction into the tube portion by the water flowing through the latter.

In the use of the spraying device with the broom, the hose is first connected to a faucet and the faucet opened to supply water to the chamber 29. By now whisking the broom in the usual manner over a floor or floor covering, the rising dust can be arrested, settled and sterilized and the floor covering likewise sterilized, by causing a sterilizing solution to be discharged from the nozzle 24 in the form of a downwardly directed spray.

This is effected by the sweep opening the valve 26 through operation of the lever 34, for with the opening of the valve, water under pressure from the chamber 29 will flow downwardly through the tube 22 to induce the sterilizing or germicidal agent in the container 41, into the tube and to be intermixed with the water, so that the liquid as finally discharged from the nozzle is a sterilized or germ killing solution in spray form.

If it is desired to use the spraying device separately from the broom, it may be readily detached therefrom by removing the screws 17 to allow disconnection of the handle section 18 from the handle section 16. Manifestly, such broom detachment does not affect the operation of the spraying device to discharge the solution in spray on any surface desired. Also, by uncoupling the hose 40 from the pipe 37, the broom may be used in the usual manner for sweeping surfaces.

Referring now to Fig. 3, I have here shown another form of broom and spraying device embodying my invention in which the broom head 45 is secured to one end of a one piece handle 46 by means of a wire 47, such handle being tubular and preferably formed of metal. By a reduced bore 48 the handle 46 is interiorly divided into a valve chamber 49 vented as at 49a, and a fluid storing chamber 50, the upper end of this chamber being closed by a screw plug 51. A valve 52 is movable in the chamber 49 to open and close the inner end of a spout 53 which extends to one side of the broom head 45.

The valve 52 is operable by means of a rod 54 fixed thereto and movable in the reduced bore 48, the upper end of the rod being movable in the plug 51 and its projecting end pivotally connected, as at 55, to a lever 56, the latter being fulcrumed as at 57 on ears 58 fixed on the plug 51. A spring 59 surrounds the projecting end of the rod 54 between the plug and the lever 56 to normally urge the rod upwardly and maintain the valve 52 closed in respect to the spout 53.

The handle 46 is provided adjacent its upper end with a lateral extension 59' which is tubular and communicates with a chamber 50. This extension is provided for the purpose of introducing into the chamber 50 a capsule or cartridge containing carbon dioxide gas or any other gas suitable to build up within the chamber the requisite pressure to cause expulsion of liquid contained in the chamber outwardly through the spout 53. The extension 59' is normally closed by a screw plug 60.

In practice, the chamber 50 is filled with water through the extension 59', and then a gas capsule or cartridge introduced to place the water under pressure, it being understood that the valve 52 is normally closed. Opening of the valve can be effected through operation of the lever 56 to move the rod 54 downwardly, and once this occurs the water under pressure in the chamber is expelled to one side of the broom head through the nozzle 53.

Referring now to Fig. 4, I have here shown a third form of combination broom and spraying device in which a handle section 61 is detachably secured to a short handle section 62 for the broom head 63 by screws 64. The handle section 61 is tubular to provide a cylinder for a pump. Just above the handle section 62 a tube 65 extends into the cylinder and into a plug 66 which closes the lower end of the cylinder but not the tube. The lower end of the tube, which projects downwardly to one side of the broom head, is provided with a discharge nozzle 67.

In the upper end of the cylinder 61 is a screw plug 68 in which is movable the rod 69 of a piston 70, the upper end of the rod being provided with a handle 71. As in the form shown in Fig. 3, the handle section 61 is provided with a lateral extension 72 adjacent its upper end, and this extension is tubular and normally closed by a screw plug 73.

In practice, the cylinder 61 may be filled with a sterilizing liquid through the extension 72 by first elevating the piston 70 to a point above the extension. With the cylinder thus filled the liquid can be expelled therefrom through the tube 65 and downwardly of the nozzle 67 by forcing the piston 70 downwardly in the cylinder through the handle 71.

Although I have herein shown and described only three forms of hand brooms and spraying devices each embodying my invention, it is to be understood that various changes and modifications may be made therein without departing from the spirit of my invention and the spirit and scope of the appended claim.

I claim:

In combination: a broom having a head, and a tubular handle coaxial therewith; a discharge tube in said handle extending downwardly thereof to one side of said head; a spray nozzle on the free lower end of said tube positioned to discharge a liquid in spray form downwardly to one side but away from the head; means on the free end of said handle affording connection for a hose and providing communication between the hose and said tube whereby water under pressure may be supplied to said tube; valve means on said handle for controlling the supply of water from said hose to said tube; and a container for a sterilizing liquid secured to said handle and communicating with said tube so that upon the flow of water through said tube liquid from said container will be introduced into the tube and intermixed with the water in the discharge of the latter from said nozzle in the form of a spray.

RALPH RAYMOND REED.

REFERENCES CITED

The following references are of record in the file of this patent:

UNITED STATES PATENTS

| Number | Name | Date |
|---|---|---|
| 362,056 | Block | May 3, 1887 |
| 412,092 | Jacoby | Oct. 1, 1889 |
| 595,761 | Brockmann | Dec. 21, 1897 |
| 714,814 | Membery | Dec. 2, 1902 |
| 894,359 | Anthony | July 28, 1908 |
| 954,260 | Davis | Apr. 5, 1910 |
| 1,223,658 | Bacon | Apr. 24, 1917 |
| 1,325,200 | Kirsch | Dec. 16, 1919 |
| 1,512,740 | Baker | Oct. 21, 1924 |
| 2,306,778 | Carney | Dec. 29, 1942 |

FOREIGN PATENTS

| Number | Country | Date |
|---|---|---|
| 483,117 | Great Britain | Apr. 12, 1938 |